Oct. 2, 1934. T. C. ALFRED Re. 19,330

HAMMER MILL

Original Filed July 17, 1928 2 Sheets-Sheet 1

Inventor
Theodore C. Alfred

By W. S. McDowell
Attorney

Oct. 2, 1934. T. C. ALFRED Re. 19,330

HAMMER MILL

Original Filed July 17, 1928 2 Sheets-Sheet 2

Inventor
Theodore C. Alfred

By W. S. McDowell
Attorney

Reissued Oct. 2, 1934 Re. 19,330

UNITED STATES PATENT OFFICE 19,330

HAMMER MILL

Theodore C. Alfred, Lancaster, Ohio

Original No. 1,829,325, dated October 27, 1931, Serial No. 293,400, July 17, 1928. Application for reissue April 29, 1933, Serial No. 668,601

5 Claims. (Cl. 83—11)

Figure 2:
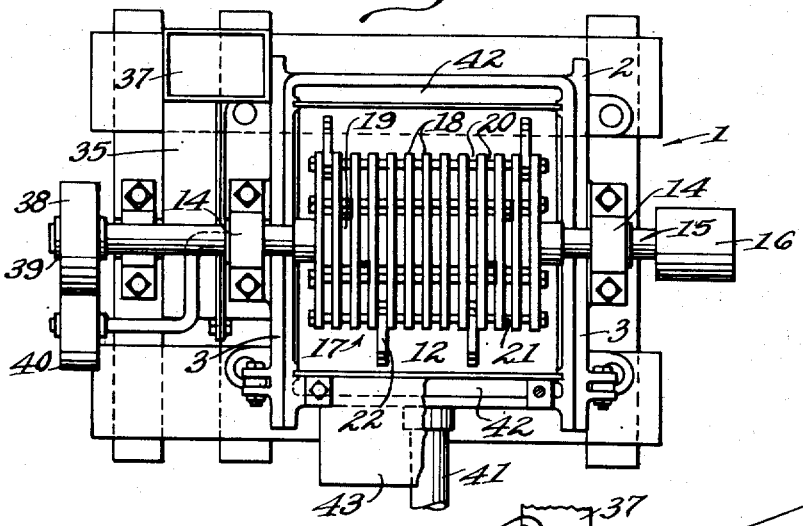

This invention relates to improvements in hammer mills and has particular reference to hammer mills of the type including a casing in which is mounted a rotor carrying a plurality of centrifugally acting hammers which, upon rotation, assume extended positions contacting with the material introduced into the casing so as to reduce such material to a divided comminuted form.

It is an outstanding object of the invention to provide a reduction or hammer mill of the type set forth wherein is provided a power driven rotor and a suction producing fan by means of which rotor the material acted upon and reduced by the rotor and its associated hammers may be suitably screened and then by the action of the fan withdrawn from the casing of the mill and transmitted to a suitable point of discharge.

It is another object of the invention to provide separate shafts for the rotor and the fan and to provide power transmitting means between said shafts so that both the rotor and the fan may be driven from a common source of power and at proper relative rates of speed to secure the most efficient operation.

It is another object of the invention to construct the rotor and associated hammers so that the mill will be very efficient from a standpoint of being able to grind or reduce the materials placed therein to a relatively fine form of subdivision, to enable the mill to have a relatively large capacity in proportion to the size of the rotor and the general dimensions of the mill and at the same time to permit of the use of a prime mover having a horse power equivalent to that commonly found in connection with power plants of farm tractors or larger power plants.

In reduction or hammer mills of the character specified, use is made of a horizontally positioned substantially semicircular screen so disposed as to divide the interior of the mill housing or casing into a rotor or grinding chamber and a discharge chamber for the reduced or ground material. This screen, due to its operative position and curvature, readily clogs with ground material in regions where gravity has the least effect upon the material, with the result that the normal passage of the reduced material through the screen is hindered and the capacity and efficiency of the mill proportionately reduced. It is, therefore, an outstanding object of the invention to maintain the full area of the screen opening during sustained periods of operation of the mill by providing its housing with restricted air inlet means, such means being located adjacent to the upper portions of the screen so that air drawn into the mill by an associated fan will be passed over the screen with such velocity as to create suction forces of a character which will serve to clear the screen of obstructing ground material and keep the holes therein open during the entire grinding period. Another advantage to be gained by the provision of the restricted air inlets disposed adjacent to the screen resides in the fact that the mill may be ventilated and the dust incident to its operation drawn off practically at the time of its formation, thereby not only maintaining the operating efficiency of the mill but eliminating fire hazards which are present when mill dust of this character is permitted to accumulate.

With these and other objects in view which will appear as the description proceeds, the invention consists in the novel features of construction, combination of elements and arrangement of parts hereinafter fully described and pointed out in the appended claims.

Figure 1:
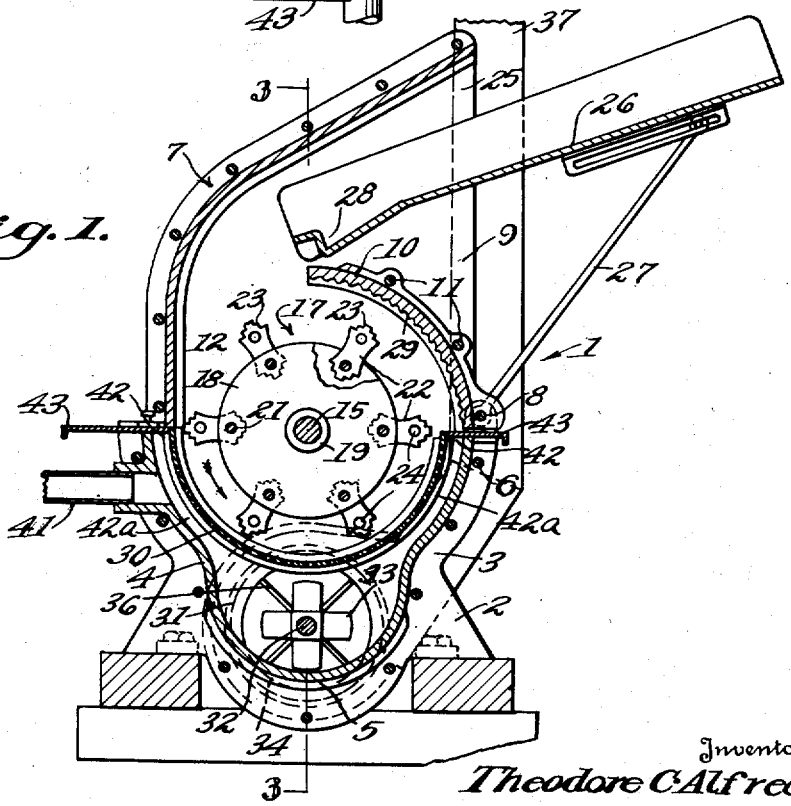
Figure 3:
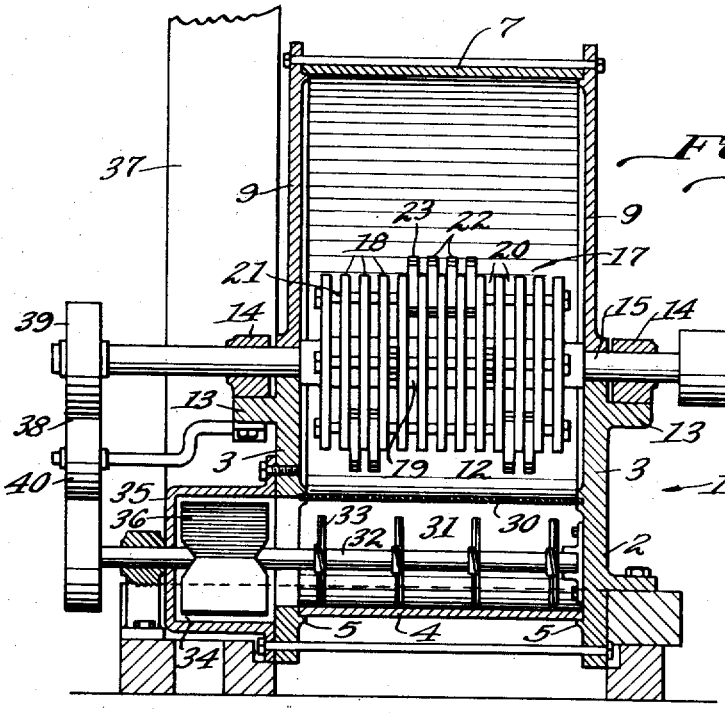
Figure 5:
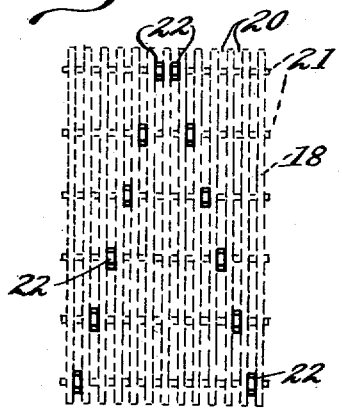
Figure 4:
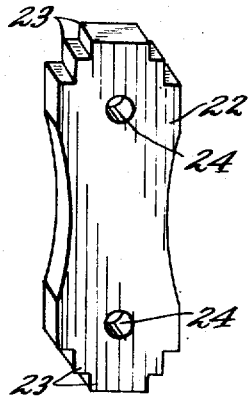

In the accompanying drawings:

Fig. 1 is a vertical longitudinal sectional view taken through a hammer mill constructed in accordance with the present invention, Fig. 2 is a plan view of the mill with the cover section of the casing removed, Fig. 3 is a vertical sectional view taken on the plane indicated on the line 3—3 of Fig. 1, Fig. 4 is a perspective view of one of the rotor hammers, Fig. 5 is a diagrammatic view disclosing working positions of the hammers in connection with the rotor.

Referring more particularly to the drawings, the numeral 1 designates the hammer or reduction mill in its entirety. Broadly, the mill comprises a casing or housing which includes a heavy base section 2, embodying heavy cast metal side plates 3—3 and a transversely extended curved bottom plate 4, also of cast metal. The plates 3—3 are provided with ribs or flanges 5 constituting seats for the plate 4, and transverse section tie rods 6 passed through a line of openings formed in the outer edges of the plate 4 so as to firmly unite the plates 3—3 with the bottom plate 4 and to produce a solid, rigid construction fully capable of withstanding the service and conditions to which a mill of this character is placed. In combination with the base section 2, the housing of the mill includes a cover or hinged hood section 7. This hood section is hinged as at 8 to the base section and includes spaced side plates 9—9, which register with the plates 3—3. Between the plates 9—9, there is secured a transversely extending arched wall 10, which is held between the plates 9—9 by means of the tie rods 11. In operation the base section of the housing and the cover section occupy the closed relationship as set forth in Fig. 1 so that there is produced within the housing a rotor chamber 12 in which material is fed and reduced to a subdivided form as will be apparent hereinafter.

The plates 3—3 contiguous to their upper edges are provided with outstanding brackets 13, which constitute foundations for the reception of journal bearings 14, which receive for rotation a rotor shaft 15. One end of this shaft is provided with a belt wheel or the like 16 by means of which the rotor shaft may be revolved by any suitable source of power, most often a farm tractor, although the device may be equipped with its own motor. Arranged on the rotor shaft within the chamber 12 is a rotor 17. This rotor comprises a plurality of discs 18, each disc being provided with a spacer 19 so that uniform spaces 20 will be provided between each pair of adjoining discs. Contiguous to their perimeters the discs 18 are formed with registering openings for the reception of transversely extending hammer shafts, or rods 21, and rotatably mounted upon these shafts and adapted to occupy the spaces 20 are a plurality of centrifugal hammers 22. Each of these hammers, as shown in Fig. 4, comprises a flat bar of metal stock having the ends thereof formed to include stepped or notched projections 23, and adjacent to these projections each hammer is provided with an opening 24 adapted for the reception of the particular shaft or rod 21 upon which the hammer may be mounted. In operation, when the rotor is revolved at working speeds, the hammers, as shown in Fig. 1, corresponding to centrifugal forces, assume an extended radial position with respect to the axis of the rotor shaft so that the outer ends of the hammers will closely engage with the walls of the chamber 12 to contact or strike the loose materials fed into the chamber and by the velocity of the rotor and the action of the hammers, to reduce such material to the desired state of subdivision. The hammers, it will be observed, are double ended so that when one end wears to too great an extent for further effective use, the hammer may be reversed to present its other end and thereby restore the efficiency of the device. I prefer to use the double openings 24 rather than an elongated slot for the reason that such openings preserve to better advantage the relationship between the end of each hammer and the wall of the chamber 12. By reference to Fig. 5, it will be observed that the hammers are set in substantially V shaped relationship around the periphery of the rotor. This V shaped arrangement of the hammers is of very great importance in confining the material to be reduced to the confines of the rotor proper. The arrangement permits the material to work toward the center of the rotor where it is bound to be struck by the flying hammers. In fact, the V shaped arrangement provides a conveyor action, preventing the scattering of the material to inaccessible corners of the rotor chamber or, stated more positively, the material is restricted in its movement to the zone of the hammers. While I shall show the hammer situated in substantially V shaped order commensurate results could be obtained if the hammers were arranged in X order or in W order.

The hood section 7 provides a receiving mouth 25 into which the loose material such as fodder, hay and various grains may be fed into the reduction chamber 12. To facilitate this there is provided a serving table 26 which in operation assumes the inclined position shown in Fig. 1 and is retained in such position by supporting rods 27. The end of this table nearest the mouth 25 includes a pocket 28, which acts as a trap to minimize the possibility of foreign materials such as metals entering the rotor chamber with the feed materials to be ground. Preferably, the inner surfaces of the wall 10 are roughened or corrugated as at 29 to assist in the material reduction action of the mill when the rotor is revolved. It will be observed that the hammers do not touch any of the metal parts or walls of the rotor chamber and contact merely with the material under process of reduction. This results in prolonged life on the part of the hammers with but minimum wear.

The intermediate portion of the housing, around the lower part of the rotor, is provided with a removable perforated shell or plate 30. This plate acts as a screen enabling material of proper fineness to sift through the same into the fan or outlet chamber 31 arranged in the lower part of the housing. The plate or screen 30 may be readily removed by lifting the hood section 7. This permits screens having various effective sizes to be used in connection with the rotor.

Within the outlet chamber 31 there is provided a longitudinally extending shaft 32, upon which are mounted agitator blades 33. These blades, upon the rotation of the shaft 32, serve to advance the finely ground material received within the outlet chamber, toward a fan chamber 34, formed in connection with the base section 2 and arranged at one side thereof. The fan chamber is produced by a housing 35, secured to one of the plates 3. Disposed within said chamber is a fan 36 which operates upon the material, received within the chamber 34, to expel the same from the machine by way of an outlet duct 37 which leads to a suitable point of discharge. The outer end of the shaft 32 is provided with a belt wheel around which is trained a belt 38 which leads to a wheel 39 carried by one end of the rotor shaft. An idler 40 engages with the belt 38 to maintain the belt in the required taut condition suitable for the best operation. Entering the outlet chamber 31, below the screen 30, or to one side of said screen, is an air inlet conduit 41 which provides for better air circulation through the housing and facilitates the withdrawal of the ground material. The housing may also be provided with supplemental air inlet openings 42, the opening and closing of which may be regulated by an adjustable slide 43.

In the design of this hammer mill careful attention has been given to various engineering factors which play such an important part in securing effective and efficient operation. The width of a rotor, for example, is determined more or less by the size of the rotor shaft and the velocity or speed of the rotor by the strength of the materials comprising the same or, in other words, the relation of the tensile strength to the centrifugal force developed. Theoretically, at least, the higher the rotor speed the more effective the reduction of materials handled thereby because of the increased velocity, which enables the hammers to deliver harder blows and to permit such hammers to pass a given point oftener, striking more blows per minute. Practically, of course, the speed is controlled by other factors, especially where the mills have the fan mounted directly on the rotor shaft. In the present invention it will be noted that the fan is mounted on its own shaft independently of the rotor shaft. At excessive speed it takes a considerable amount of power to drive the fan and because of the very nature of the work done by the mill, which consists of a series of shocks, the speed must be less than would be safe for a fly wheel of the same material that simply revolved and had no other work to do.

Tests have disclosed that 3000 R. P. M. is the most efficient speed for a 22 inch diameter rotor, although this is approximate and such mills may run faster or slower. Naturally, the diameter of the rotor must be taken into consideration, as the peripheral speed of the rotor, regardless of size, should be about the same. It is quite possible to manufacture a mill with a very small rotor to operate at a speed of 7000 R. P. M., and again going to the other extreme, it is possible to operate satisfactorily a larger rotor at a speed of 700 R. P. M. or less.

With a small diameter rotor a higher speed is necessary to obtain the desired peripheral speed and to produce the necessary forces for shattering material because there is practically no weight comparatively to the rotor itself. The chief drawback of the small rotor is that the spread between the bearings, that is side walls of the housing, cannot be great. In fact, about six inches is very nearly the limit for a small machine which, as a consequence, possesses little or no utility for handling farm products, such as ear corn. The small high speed mill has one outstanding advantage and that is, more hammers will pass a given point in a given length of time which, of course, means a finer product. However, to widen the space between the bearings on the small cylinder sufficiently to take in the average grinding commodity would mean instant breakage of the mill. As a consequence the rotor shaft has to be made larger in order to stand a greater bearing spread, also the discs must be larger, and as a consequence, the speed must be reduced so that the larger the mill the slower it must operate and as a consequence fewer hammers will pass a given point in a definite length of time.

From a power standpoint, a four pin rotor using three discs and a hammer on each pin between the discs, or a total of eight hammers staggered slightly, would require eight horsepower to operate the same to cover an area on the screen of approximately two inches in width and, in this connection, each additional set of four hammers would require four more horsepower and so on. It is known that a six pin rotor, travelling at the same speed as a four pin rotor, and carrying a full set of hammers on each pin, will strike fifty per cent. more blows at any speed than the four pin rotor. Also an eight pin rotor will strike twice as many blows at the same speed as the four pin rotor, and this could be carried on indefinitely. The drawback here is, however, that it would take about one horsepower per hammer to satisfactorily operate such mill at efficient grinding capacities. This is because of the resistance of the hammer itself on the incoming material and hammers cannot be added at will without materially increasing the horsepower requirements of the machine. Furthermore, the arrangement of the hammers on the rotor has considerable to do with the power requirements. The standard or more common way of mounting the hammers on the disc pins is to situate a series or a battery of hammers upon each pin. A rotor having 10 discs would have nine spaces between the discs and a four pin battery assembly would then require 36 hammers. This would cover an area, depending upon the design, of approximately 15 inches. When a hammer mill is large enough to accommodate the materials to be ground, such as roughage, ear corn, fodder and the like grown on farms, a standard condition is reached. To make the mill still larger, it is necessary to add additional hammers to cover the greater screen width and this would require additional horsepower. Since the average farm power is in the form of a tractor developing about 20 to 25 horsepower, a limitation is placed on the size of the hammer mill, since the rotor must be made to function with the power generally available on a farm. For example, a reduction mill requiring at least 40 horsepower to operate efficiently, would not find wide favor for the reason that its power requirements are too high and are not available to the ordinary farmer. It would be much better to operate two small units of lower horsepower than one large unit, for two reasons: The large unit would necessarily have a much heavier shaft, and as a consequence larger discs, which would make it operate at slower speed and additional hammers would have to be had to cover the additional screen width, but because of the larger diameter of the rotor, less hammers would pass a given point in the same length of time, as the speed of this unit could not be much over 2200 R. P. M., consequently to get the same number of hammer blows, additional pins would have to be added to carry more hammers. This could be worked out satisfactorily but the result would be power requirements far in excess of that which is ordinarily available.

On a reduction mill of any size the efficiency should be the same when adding any number of units of the same dimensions. In other words, a 15 inch mill with 36 hammers requiring 40 horsepower, and a 30 inch mill of the same dimensions would require 80 horsepower, and a 45 inch mill 120 horsepower. The difficulty is that structural objects are encountered in attempting to widen out a 15 inch mill to a 30 inch mill, using the same size shaft and cylinder, and this is the reason that the mill should not be larger than necessary to accommodate the materials to be ground.

Now it is quite evident that a 15 inch mill meets the requirements so far as accommodating material is concerned. If this were made in battery type assembly, using four pins, 36 hammers would be required to properly cover the screen. Therefore, it is quite evident that if some arrangement of hammers could be devised that would effectively cover this same area with a smaller number of hammers, less horsepower would be required. The product, of course, will not be as finely ground at the same speed, but commercially the limitation is more from the power to be applied, as the product of fewer hammers is quite satisfactory, and if it is possible to maintain in the mill a flexibility of hammer application so that additional hammers can be applied as additional power is available a very desirable situation or combination is effected. This is secured by the dimensions of the rotor disclosed herein with the substantial V arrangement of the hammers as set forth in Fig. 5.

Tests have been made with this V type of rotor, using 16 hammers with thinner discs over the same screen area, namely 15 inches, but it has been found that such a mill is really too great a load for an ordinary farm tractor and in the design of the present invention, my problem was to maintain the 15 inch mill and still cover the screen if possible with fewer hammers. This I accomplished by making the discs 18 thicker, in other words using discs having a thickness of one-half an inch where before one-quarter inch discs were used, and reducing the number of hammers to 12. Generally speaking, I consider the mill to require eight horsepower when running empty, which leaves 12 horsepower of the normal 20 available for grinding, or one horsepower per hammer, giving the desired arrangement when the mill is operated with farm tractor power.

Furthermore, in increasing the thickness of the discs on the rotor, I have added weight to the revolving part of the mill and this produces a fly wheel action, which gives more uniform application of the power and eliminates to a great extent the jars and jerks found on mills where this unit is lighter in weight.

As shown in Fig. 5, the hammers 22 are arranged in a V order about the rotor, there being two hammers to a pin on a six pin rotor. This is an efficient number of hammers for the production of a satisfactorily ground product, and conforms to the light power available on an average farm. The V arrangement of the hammers has a tendency to throw the material back and forth within the upper housing, while with an aligned or battery arrangement of hammers, the material simply follows around in the direction of the rotor. The six pins are used so that there will not be too great a space between the hammers around the circle, as a V type arrangement would not be desirable on a four pin rotor. It would be satisfactory on an eight pin rotor, but this would require 16 hammers which places too great a load on the power supplying unit.

To make the rotor larger would mean less speed, reducing the number of hammer blows, and to make it smaller would require a greater speed, and while this would improve the efficiency of the mill its capacity to receive material suitable for farm usage is obstructed.

With these features in mind, I have constructed the present invention so that the rotor includes six pins with two hammers on each pin, which provides approximately one horsepower per hammer when a Fordson tractor is used. When a 25 horsepower operating motor is used, it simply means that the machine will handle a little larger quantity, although the sample will be somewhat coarser because there is being fed more material against a definite number of hammer blows per minute. However, when 30 horsepower is applied to the rotor shaft, there is added another set of 12 hammers to the rotor in a double V or X formation. This is maintained up to 40 horsepower. When 50 horsepower is used I put on 36 hammers, in staggered formation, since this flexibility of hammer application is very desirable.

This gives a wide spread of usage or adaptability for the mill, and makes it possible for one size mill to fit in where ordinarily it requires three sizes. In the battery type of mill there can be added a certain amount of additional horsepower, for example 10, to advantage, but to continue to add horsepower to the mill and to feed it more heavily, will coarsen the sample to such an extent that it is not satisfactory, and, of course, in the battery type of four pin rotor there is no room for additional hammers, so that the range is limited, and as a rule specifications on a mill of this kind will be given with a 10 horsepower spread, while in the present invention a flexibility of hammer assembly enables the mill to be rated from between 15 to 50 horsepower.

In view of the foregoing it will be seen that the present invention provides a hammer or reduction mill wherein an improved rotor construction is provided by means of which the mill is rendered adaptable to the power equipment of ordinary farms, in that it is possible to use, without employing a special motor, a construction which will enable all sizes of farm products to be handled and reduced adequately to a proper form of subdivision. In this respect I have provided a hammer mill of large capacity with minimum power requirements. It will be understood that as additional power is available more of the hammers may be added to the rotor. This enables the mill to possess a greater capacity without material change in its construction. In fact, the mill can operate efficiently when power to the extent of 15 to 50 horsepower is being applied thereto.

An important feature of the present invention resides in the improved ventilation of the mill whereby to quickly and positively remove the finely divided reduced particles of material substantially at the time of their formation whereby to maintain the operating efficiency of the mill and provide safety in operation. To this end, the housing is provided with the air inlet openings 42 which, as shown in Fig. 1, may communicate directly with the atmosphere exteriorly of the housing, as at the left of the figure, or may communicate indirectly with the atmosphere through the upper region of the housing, as at the right of Fig. 1. The effective area of these air inlet openings, or the amount of air admitted therethrough, is subject to regulation by the provision of the adjustable sliding closures 43, or their equivalents. The openings 42, it will be observed, are located adjacent to the upper longitudinal edges of the perforated plate or screen 30 so that the air drawn therethrough will pass directly over the outer surfaces of the screen at high velocity, particularly in the region of the upper edges of said screen. As the holes in the upper portions of the screen have their axes disposed at substantial angles to the vertical, they readily become, in the usual type of mill, filled with clogging particles of ground material. By the present invention, however, the air drawn past the screen serves to create suction forces or unbalanced pressures on the opposite sides of the screen, which are of sufficient magnitude to effect the positive withdrawal of such material from the openings in the screen substantially as fast as such material is deposited, thereby keeping the screen openings free from such clogging materials and preventing diminution in the operating efficiency of the mill due to imperfect screen action. When grinding materials, such as industrial wastes and the like, or those having a high moisture content, each side of the mill may be opened for air flow by uncovering both of the openings or slots 42, thus permitting a decided aeration of the product to take place and making it possible to grind materials of higher moisture content than can be usually successfully handled on the ordinary type of mill. The fact that the walls of the housing follow the curvature of the upper portions of the screen and are closely arranged relatively thereto, elongated restricted passages 42*a* are provided which function to increase the velocity of the air drawn into the mill through the inlets 42 and while passing the upper regions of the screen, thereby effecting a more positive and thorough cleaning of the screen. This rapid movement of the air when drawn along the bottom of the screen also effects the removal of the dust from the mill, which forms an important advantage over a non-ventilated mill in that it provides for more pleasant operating conditions and also the elimination of dust in the room in which the mill is positioned, thereby increasing the comfort of the operatives and reducing fire hazards.

What is claimed is:

1. In a hammer mill, a casing, a reduction rotor mounted for rotation in said casing, a semi-cylindrical screen in said casing below said rotor, said screen serving to divide the interior of said casing into a rotor chamber and a discharge chamber, said casing being formed to include an opening parallel with and adjacent one horizontal edge of said screen, adjustable means for effecting the closure of said opening and a conduit connected with said casing below said opening for admitting air into said discharge chamber.

2. In a hammer mill, a housing, a rotor carrying pivoted hammers adjacent to its peripheral region, said rotor being mounted for rotation about a substantially fixed axis extending longitudinally through the housing, a substantially semicylindrical closely perforated plate having relatively vertical side portions stationarily mounted in said housing and slightly spaced from and conforming to the lower half of the circular orbit of travel of the outer ends of said hammers during operation of the rotor, the walls of the lower portion of said housing immediately below the axis of said rotor being slightly spaced from and substantially parallel to the relatively vertical portions of the said plate to produce relatively restricted throats, the latter terminating in the extreme lower part of said housing in a relatively enlarged material discharge chamber, a fan communicating with said chamber, and adjustable means for admitting air to pass downwardly through the restricted throats of said housing during the operation of said rotor and fan whereby to produce positive suction forces in said throats of sufficient magnitude to effect positive removal of ground material from the perforations of said plate communicating with said throats.

3. In a hammer mill, a housing, a reduction rotor revolubly mounted in said housing about a substantially fixed longitudinal axis extending through the housing, a substantially semi-cylindrical screen stationarily mounted in said housing and slightly spaced from the lower half of said rotor, the walls of the lower portion of said housing immediately below the axis of said rotor being spaced from and curved to substantially parallel the said screen throughout the relatively vertical portions thereof to produce relatively restricted throats between the walls of the housing and the relatively vertical portions of said screen, suction producing means communicating with said housing to withdraw reduced material passed through said screen, and means for admitting air to pass downwardly through said throats during the operation of the mill whereby to establish unbalanced air pressures on the opposite sides of said screen in the regions of said throats, said unbalanced pressures serving to effect a positive withdrawal of reduced material through the perforations provided in the relatively vertical portions of said screen.

4. In a hammer mill, a casing, a reduction rotor mounted for rotation in said casing, a semi-cylindrical screen in said casing below said rotor, said screen serving to divide the interior of the casing into a rotor chamber and a discharge chamber, said casing being formed to include an opening parallel with and adjacent the horizontal upper edges of said screen, and adjustable means for effecting the closure of said opening.

5. In a hammer mill, a casing including a rotor chamber and a discharge chamber, a semi-cylindrical screen dividing said chambers, a fan in communication with said chambers, and air inlets provided in said casing, said inlets being located parallel with and adjacent to the upper horizontal edges of said screen to create air streams past said upper edge portions during operation of the mill.

THEODORE C. ALFRED.